(12) United States Patent
Sugizaki et al.

(10) Patent No.: US 9,106,855 B2
(45) Date of Patent: Aug. 11, 2015

(54) RADIOLOGICAL IMAGE DETECTION APPARATUS

(75) Inventors: Makoto Sugizaki, Kanagawa (JP);
Takeshi Kuwabara, Kanagawa (JP);
Yasufumi Oda, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 273 days.

(21) Appl. No.: 13/570,911

(22) Filed: Aug. 9, 2012

(65) Prior Publication Data
US 2013/0075619 A1 Mar. 28, 2013

(30) Foreign Application Priority Data
Sep. 28, 2011 (JP) .................................. 2011-213318

(51) Int. Cl.
*G01J 1/42* (2006.01)
*H04N 5/361* (2011.01)
*H04N 5/32* (2006.01)

(52) U.S. Cl.
CPC . *H04N 5/361* (2013.01); *H04N 5/32* (2013.01)

(58) Field of Classification Search
USPC ................................. 250/394, 370.08, 370.09
See application file for complete search history.

(56) References Cited

U.S. PATENT DOCUMENTS

| 2002/0001366 A1 | 1/2002 | Tamura et al. |
| 2004/0028286 A1* | 2/2004 | Saigusa et al. ................ 382/264 |
| 2010/0040199 A1 | 2/2010 | Enomoto |

FOREIGN PATENT DOCUMENTS

| JP | 2001-340323 A | | 12/2001 |
| JP | 2001340323 A | * | 12/2001 |
| JP | 2002-357664 A | | 12/2002 |
| JP | 2002-369084 A | | 12/2002 |
| JP | 2002357664 A | * | 12/2002 |
| JP | 2002369084 A | * | 12/2002 |
| JP | 2005-245663 A | | 9/2005 |
| JP | 2005245663 A | * | 9/2005 |
| JP | 2010-042150 A | | 2/2010 |
| JP | 2010042150 A | * | 2/2010 |

OTHER PUBLICATIONS

Office Action issued by JPO on Sep. 17, 2013, in connection with corresponding Japanese Patent Application No. 2011-213318.

* cited by examiner

*Primary Examiner* — David Porta
*Assistant Examiner* — Abra Fein
(74) *Attorney, Agent, or Firm* — Jean C. Edwards, Esq.; Edwards Neils PLLC (57) ABSTRACT

A radiological image detection apparatus includes an imaging unit, a storage unit, a correction data generating unit, a correction unit, a disturbance detection unit, and a determination unit. The imaging unit acquires radiological image data. The storage unit stores correction data for correcting the radiological image data. The correction data generating unit generates new correction data based on dark image data and updates the correction data stored in the storage unit. The correction unit performs a correction process for the radiological image data using the correction data. The disturbance detection unit detects a disturbance acting when the imaging unit acquires the dark image data. The determination unit determines whether the updating of the correction data stored in the storage unit is permitted, or whether the acquisition of the dark image data is permitted, based on the detection result of the disturbance detection unit.

13 Claims, 10 Drawing Sheets

RADIOLOGICAL IMAGE DETECTION APPARATUS

CROSS-REFERENCE TO RELATED APPLICATIONS

This application claims the benefit of Japanese Patent Application No. 2011-213318 (filed on Sep. 28, 2011), the entire contents of which are hereby incorporated by reference.

BACKGROUND

1. Technical Field

The present invention relates to a radiological image detection apparatus.

2. Related Art

An X-ray photographing has been widely distributed in applications such as medical diagnoses, nondestructive inspection and the like. In a general X-ray photographing, an X-ray is irradiated to a subject and attenuated while transmitting at each part of the subject to be detected. An X-ray image of the subject is obtained based on an intensity distribution of the transmitted X-ray.

Recently, as a medium for detecting an X-ray, a flat panel detector (FPD) having a two-dimensional arrangement of pixels for detecting an X-ray and converting the detected X-ray into an electrical signal has been used. In the X-ray photographing, a so-called cassette which is configured to accommodate the FPD in a portable case has been widely used.

In general, various correction processes are performed on image data of a subject acquired by the FPD to present an image based on the corrected image data as the X-ray image of the subject. An example of the correction processes may include an offset correction.

The offset correction removes a dark current noise of each pixel of the FPD, in which the dark current is measured as an electrical signal output from each pixel when there is no input (X-ray exposure) to the FPD. The offset correction removes dark image data generated when there is no input to the FPD, from the X-ray image data generated by detecting the X-ray transmitting the subject, thereby removing different dark current noises from each pixel.

The correction processes using the dark image data may include an afterimage correction or a pixel defect correction, in addition to the offset correction.

The dark current of each pixel is very low and is susceptible to disturbances such as vibration, load, and the like. For example, the stripe-like image spots sometimes may be generated in the dark image generated under vibrations. Meanwhile, when the dark image is removed, the image spots may be generated in the X-ray image. In other words, when the correction process is performed using the dark image data acquired in a situation in which excessive disturbances act, suitable correction may not be performed. Particularly, the cassette is frequently exposed to the disturbances due to a use form thereof. Therefore, for example, an apparatus has been suggested that detects vibration when the vibration is generated and waits until the vibration is stabilized within an allowable range to acquire X-ray image data and dark image data (see, for example, JP-A-2001-340323 and JP-A-2005-245663).

The X-ray photographing apparatus as described in JP-A-2001-340323 and JP-A-2005-245663 acquires the X-ray image data and the dark image data after the detected vibration is stabilized within the allowable range. In other words, it is determined whether the dark image data is acquired together with the acquisition of the X-ray image data. In this case, the allowable range of vibration is typically set in accordance with the dark image data which is significantly affected by the vibration as compared with the X-ray image data.

For example, in performing a continuous photographing while changing photographing portions of the same subject, every time the photographing portions are changed, an X-ray image detection apparatus is vibrated. However, according to the determination whether the image data is acquired as described above, every time the photographing portions are changed, the photographing is not performed until the vibration is stabilized within the allowable range which is set in accordance with the dark image which is significantly affected by the vibration. As a result, the photographing may be delayed.

The present invention has been made in an effort to provide a radiological image detection apparatus capable of performing a suitable correction process for radiological image data and also efficiently progressing a photographing.

SUMMARY OF INVENTION

According to an aspect of the invention, a radiological image detection apparatus includes an imaging unit, a storage unit, a correction data generating unit, a correction unit, a disturbance detection unit, and a determination unit. The imaging unit includes a plurality of pixels arranged in a two-dimensional array which detect a radiation and convert the radiation to an electrical signal, and acquires radiological image data based on the electrical signal output from each pixel. The storage unit stores correction data for correcting the radiological image data acquired by the imaging unit while the imaging unit is exposed to the radiation. The correction data generating unit generates new correction data based on dark image data acquired by the imaging unit while the imaging unit is not exposed to the radiation and updates the correction data stored in the storage unit by the new correction data. The correction unit performs a correction process for the radiological image data using the correction data stored in the storage unit. The disturbance detection unit detects a disturbance acting when the imaging unit acquires the dark image data. The determination unit determines whether the updating of the correction data stored in the storage unit by the correction data generating unit is permitted, or whether the acquisition of the dark image data by the imaging unit, is permitted based on the detection result of the disturbance detection unit.

According to the present invention, a disturbance acting when acquiring dark image data is detected to determine as to whether an acquisition of the dark image data or an updating of correction data generated from the dark image data based on a detection result is permitted. If it is determined to be permitted, a suitable correction process is performed using new correction data, and if not, a suitable correction process is performed using previous correction data stored in a storage unit. Since the determination as to whether the acquisition of the dark image data and the updating of the correction data generated from the dark image data is permitted is performed separately from the acquisition of the radiological image data, photographing is efficiently progressed.

DETAILED DESCRIPTION

Figure 1:
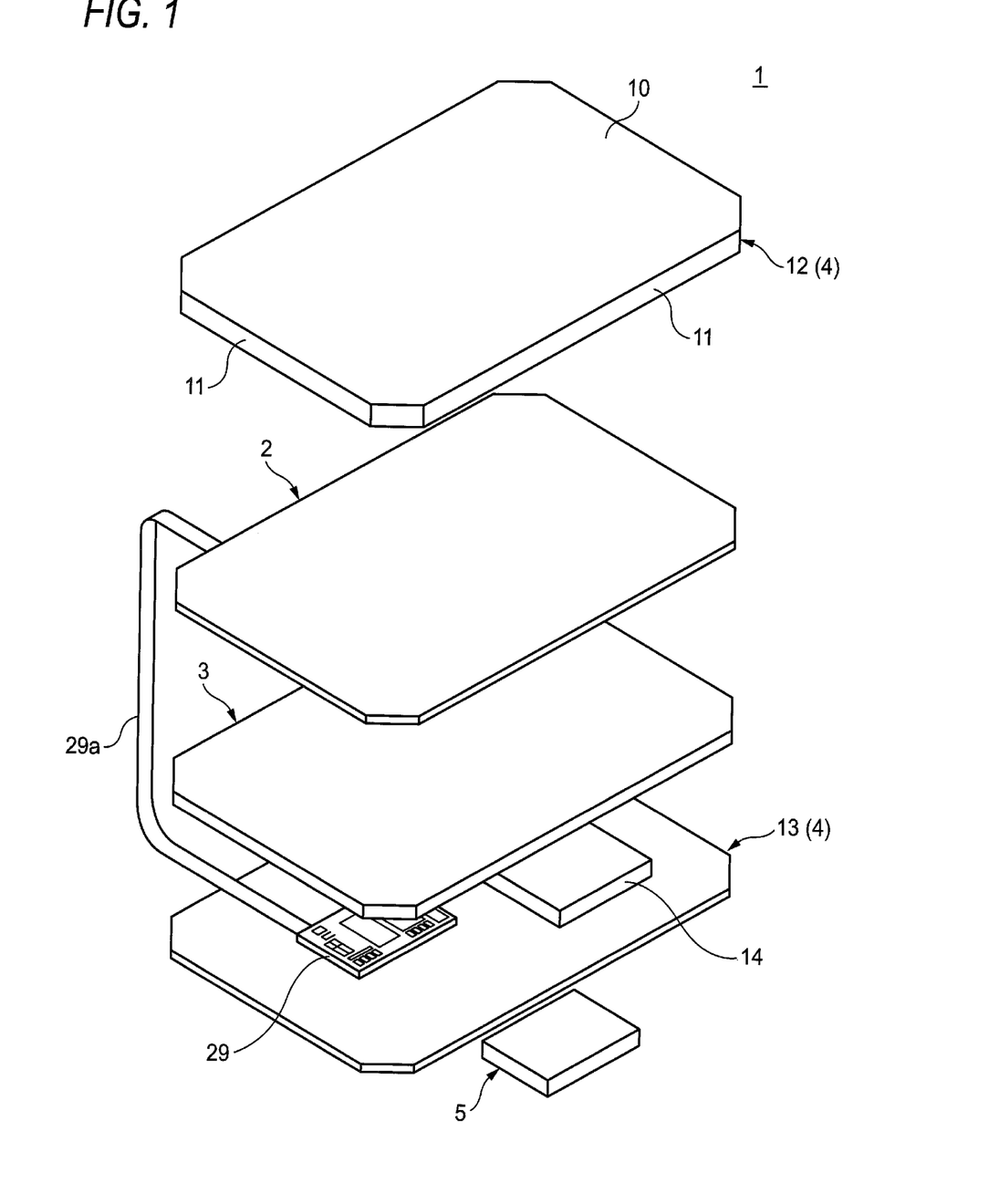
FIG. 1 is an exploded view schematically illustrating a configuration of one example of a radiological image detection apparatus according to an embodiment of the present invention.

FIG. 1 depicts a configuration of one example of a radiological image detection apparatus which is disassembled according to an embodiment of the present invention.

An X-ray image detection apparatus 1 shown in FIG. 1 is so called an electronic cassette, and includes an FPD 2, a base 3 supporting the FPD 2, a portable case 4 receiving the FPD 2 and the base 3, and a battery 5 supplying an operation power to the FPD 2.

The case 4 includes a top plate part 10 having a substantially rectangular shape, a front member 12 having the frame shaped side wall parts 11 erected at an edge around the top plate part 10, and a back member 13 blocking a bottom opening of the front member 12. The front member 12 and the back member 13 are combined with each other to form a closed space of a light-shielded box type, and the FPD 2 and the base 3 are accommodated in the closed space.

An X-ray transmitting through a subject penetrates the top plate part 10 of the front member 12 to be incident onto the FPD 2 accommodated in the case. The top plate part 10 is made of a material having an excellent X-ray transmissivity, and as the material of the top plate part 10, light metal materials such as aluminum or magnesium, or a resin material such as carbon fiber reinforced plastics (CFRP) is typically used in consideration of intensity to weight ratio and the like.

In the X-ray image detection apparatus 1, the side wall part 11 of the front member 12 and the top plate part 10 are integrally formed by the same material. Since the top plate part 10 and the side wall part 11 are integrally formed, the strength of the front member 12 is improved, and particularly a resistance against a twist of the top plate part 10 is improved.

The top plate part 10 and the side wall part 11 may be integrally formed by, for example, a diecast molding in a case of using the aluminum or the magnesium as described above, and also, for example, a compression molding in a case of using the carbon fiber reinforced plastics, as the material forming the top plate part 10 and the side wall part 11.

The back member 13 constituting the bottom of the case 4 is provided with a battery accommodating part 14, and the battery 5 is accommodated in the battery receiving part 14.

The back member 13 is also typically formed using the soft metal material such as aluminum or magnesium, or the resin material such as CFRP in consideration of the strength to weight ratio and the like.

Figure 2:
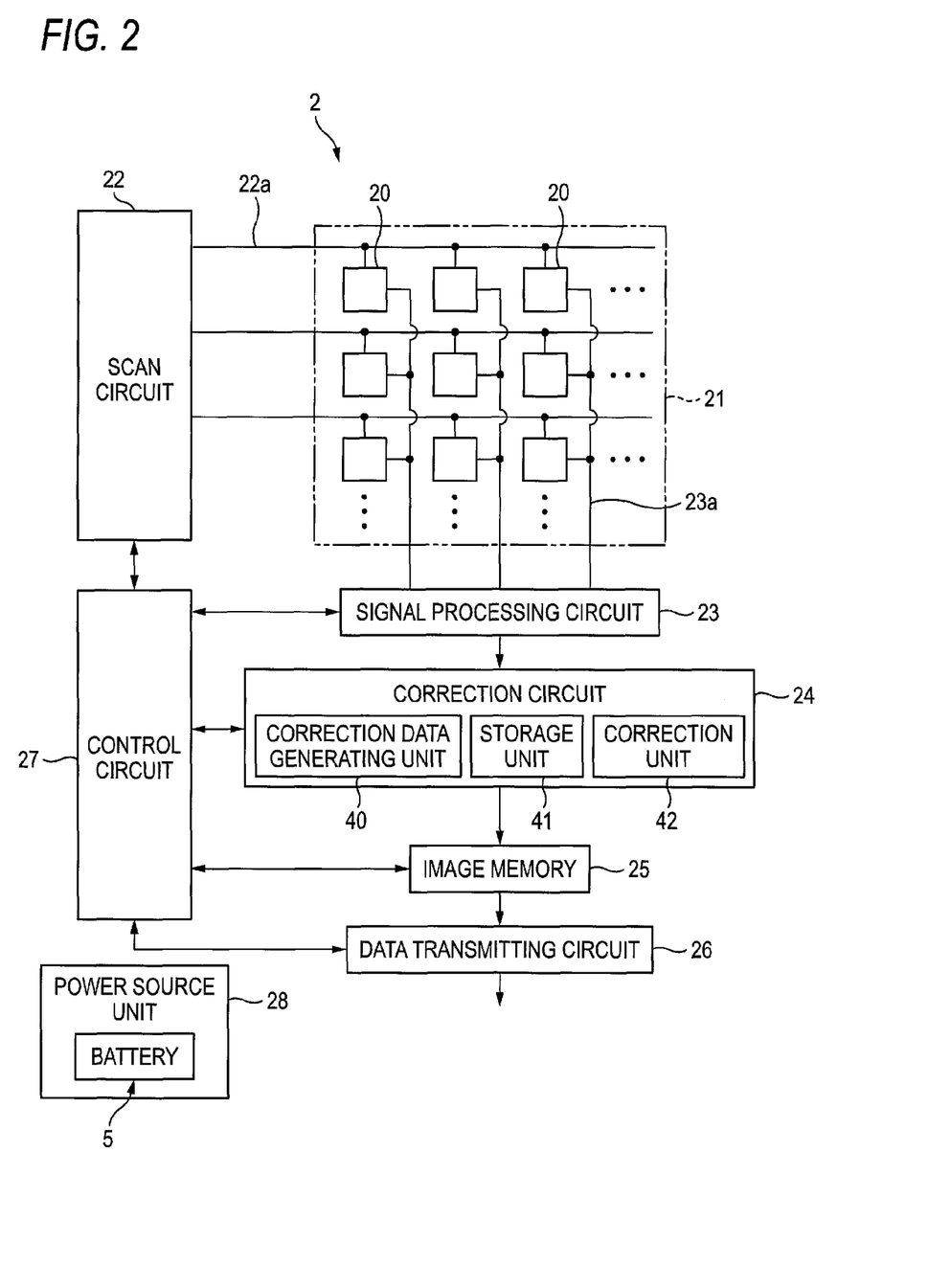
FIG. 2 is a function block view of the radiological image detection apparatus of FIG. 1.

FIG. 2 shows a configuration of the FPD 2.

The FPD 2 includes an image receiving unit 21 in which a plurality of pixels 20 converting the X-ray into an electrical charge and accumulating the converted electrical charges are two-dimensionally arranged on an active matrix type of thin film transistor (TFT) array substrate, a scan circuit 22 controlling a reading-out timing of the electrical charge from each pixel 20 of the image receiving unit 21, a signal processing circuit 23 reading-out the electrical charge accumulated in each pixel 20 and converting the read-out electrical charge to image data, a correction circuit 24 performing a suitable correction process for the image data output from the signal processing circuit 23, an image memory 25 storing the image data corrected by the correction circuit 24, a data transmitting circuit 26 transmitting the image data stored in the image memory 25 to an external apparatus, and a control circuit 27 driving and controlling each circuit 22, 23, 24, 25, 26 in appropriately timing The scan circuit 22 is connected to each pixel 20 by a scan line 22a for each row, and the signal processing circuit 23 is connected to each pixel 20 by a signal line 23a for each column.

Each pixel 20 may be configured as a direct-converting type element which directly converts the X-ray to the electrical charge in a conversion layer (not shown) such as amorphous selenium to accumulate the converted electrical charge in a capacitor connected to an electrode in a lower portion of the conversion layer. Each pixel 20 may also be configured as an indirect-converting type X-ray detection element which converts the X-ray to a visible light first using a scintillator (not shown) made of gadolinium oxide ($Gd_2O_3$), gadolinium oxide sulfide ($Gd_2O_2S$), or cesium iodide (CsI), then transforms the converted visible light to the electrical charge using a photo diode (not shown)—and accumulates the converted electrical charge.

A TFT switch element (not shown) is connected to each pixel 20, a gate electrode of the TFT switch element is connected to the scan line 22a, a source electrode thereof is connected to the capacitor, and a drain electrode thereof is connected to the signal line 23a. Once the TFT switch element is turned ON by a driving pulse from the scan circuit 22, the electrical charge accumulated on the capacitor is read-out to the signal line 23a.

The signal processing circuit 23 includes an integral amplification circuit and an A/D converter (all not shown). The integral amplification circuit integrates the electrical charge output via the signal line 23a from each pixel 20 to convert the integrated electrical charge to a voltage signal (image signal) and inputs the converted voltage signal to the A/D converter. The A/D converter converts the input signal into digital image data.

The correction circuit 24 is provided with a correction data generating unit 40 generating correction data used for a correction process performed for the X-ray image data acquired by detecting the X-ray transmitting through the subject, a storage unit 41 storing the correction data generated from the correction data generating unit 40, and a correction unit 42 stored in the storage unit 41.

The operation power is supplied to each pixel 20 and each circuit 22, 23, 24, 25, 26, 27 from a power source unit 28 including the battery 5. A wiring connecting the power source 28, each pixel 20 and each circuit 22, 23, 24, 25, 26, 27 is not shown.

Figure 3:
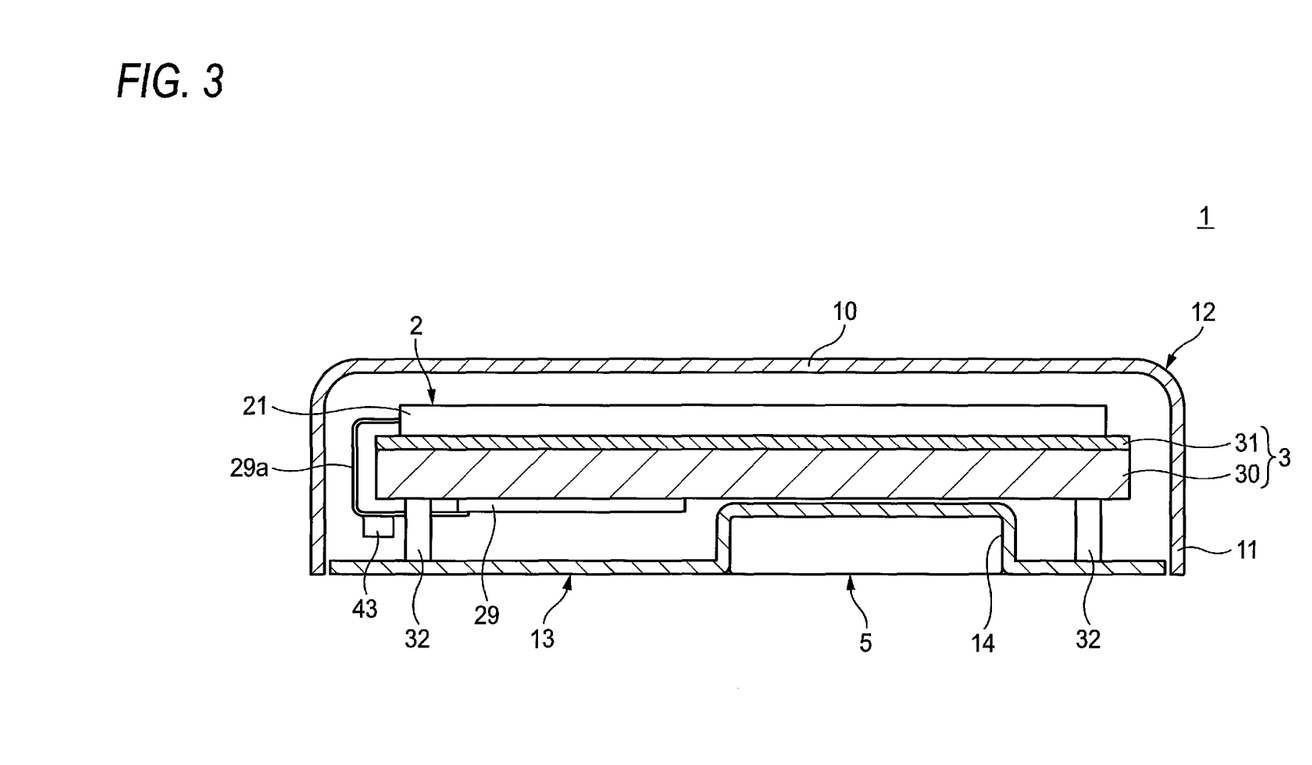
FIG. 3 is a cross sectional view of the radiological image detection apparatus of FIG. 1.

FIG. 3 shows a cross section of a configuration of the X-ray image detection apparatus 1.

The FPD 2 attaches the image receiving unit 21 on a surface of the base 3 opposing the top plate part 10 and also attaches a circuit board 29 on which a circuit such as the scan circuit 22 (FIG. 2) or the signal processing circuit 23 is mounted on a rear surface of the base 3, respectively to be supported by the base 3. The image receiving unit 21 and the circuit board 29 are connected to each other using a flexible circuit board 29a.

The base 3 includes a base material 30 having a relatively excellent rigidity, and in the illustrated example, an X-ray shielding material 31 for shielding the circuit board 29 attached to the rear surface of the base 3 from the X-ray is stacked on the base material 30.

For example, the base material 30 may use light metal materials such as aluminum or magnesium, or a resin material such as CFRP in consideration of strength to weight ratio. The X-ray shielding material 31 may use, for example, a heavy metal material having excellent X-ray absorption ability such as lead, tungsten, or molybdenum.

The base 3 is fixed on the back member 13 by interposing a spacer 32 between the base 3 and the back member 13 in order not to interfere with the battery receiving unit 14 provided in the back member 13.

The X-ray image detection apparatus 1 is provided with a sensor 43 detecting the vibration acting on the X-ray image detection apparatus 1. In the illustrated example, the sensor 43 is attached to the flexible circuit board 29a. A position for attaching the sensor 43 is not limited to the flexible circuit board, and the sensor 43 may be attached to an inner surface of the case 4, or the base 3.

As the sensor 43 for detecting the vibration, for example, an accelerator sensor, a compass sensor and the like may be used.

The vibration detected by the sensor 43 is used for acquiring the correction data used in the correction process in the correction circuit 24 of the FPD 2. Hereinafter, a process for acquiring the correction data will be described with reference to the offset correction.

Figure 4:
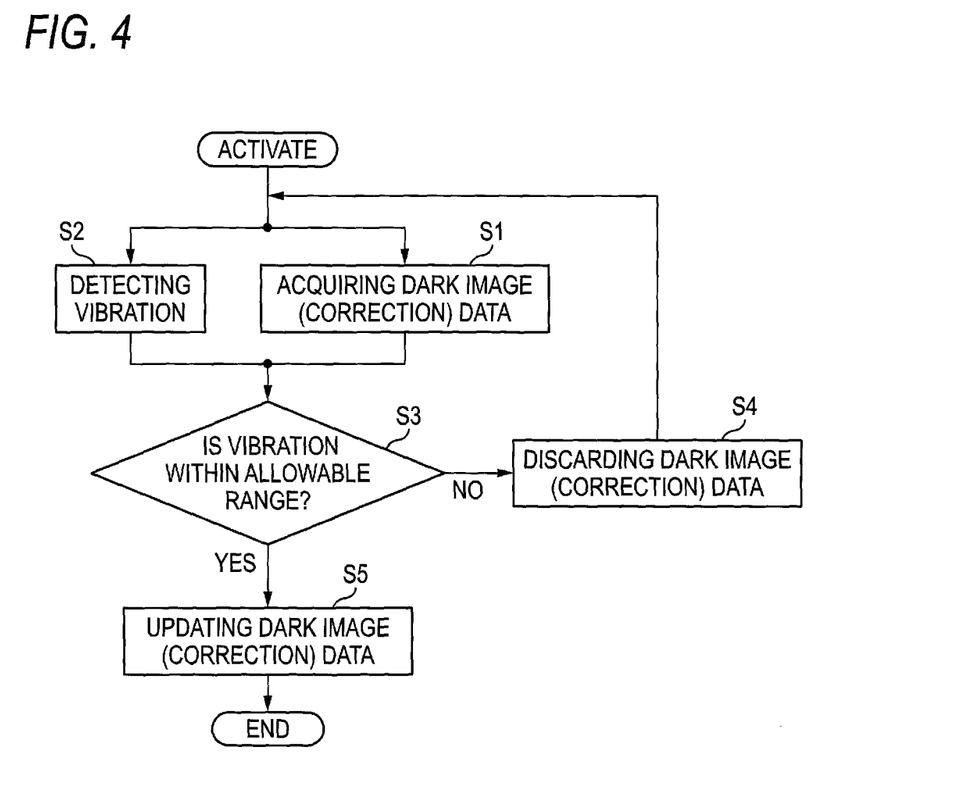
FIG. 4 is a flowchart illustrating one example of a process for acquiring correction data in the radiological image detection apparatus of FIG. 1.

FIG. 4 shows one example of a flow for acquiring the correction data.

FIG. 4 shows a flow for acquiring the correction data for the offset correction in an initialization process when the X-ray image detection apparatus 1 is activated.

As described above, the offset correction subtracts the dark image data acquired when the image receiving unit 21 of the FPD 2 is not exposed to the X-ray from the X-ray image data acquired when the image receiving unit 21 of the FPD 2 is exposed to the X-ray, thereby removing different dark current noises at every pixel.

After activation of the X-ray image detection apparatus 1, the electrical charge is read-out by the signal processing circuit 23 from each pixel 20 of the image receiving unit 21 to generate the dark image data in a state where the image receiving unit 21 is not exposed to the X-ray, and the correction data generating unit 40 of the correction circuit 24 acquires dark image data from the signal processing circuit 23 (step S1). In the offset correction, the dark image data is used as the correction data.

When the dark image data is acquired, the vibration acting on the X-ray image detection apparatus 1 is also detected by the sensor 43 (step S2).

The control circuit 27 acquires vibration information detected by the sensor 43 and determines whether or not the vibration is within the allowable range (step S3).

If it is determined that the vibration is out of the allowable range, then the control circuit 27 prohibits an updating of the storage unit 41 by the correction data generating unit 40. The correction data generating unit 40 discards the dark image data which the correction data generating unit 40 stores (step S4).

If it is determined that the vibration is within the allowable range, then the control circuit 27 permits an updating of the storage unit 41 by the correction data generating unit 40. The correction data generating unit 40 updates the storage unit 41 by the dark image data which the correction data generating unit 40 stores (step S5).

According to the processes described above, the acquisition of the offset correction data in the initialization process is completed.

Hereinafter, a method of determining the vibration in the control circuit 27 will be described.

Figure 5A:
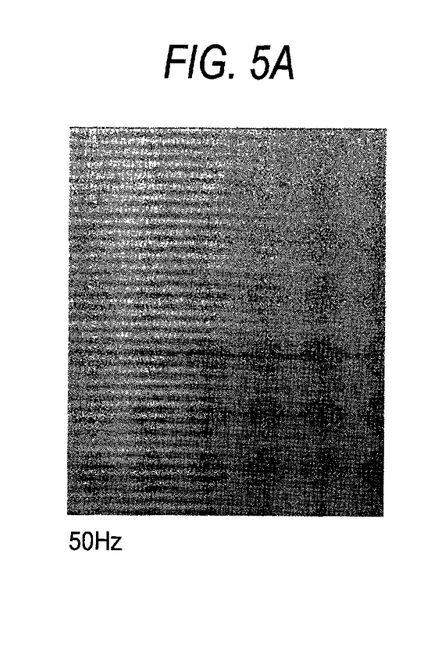
FIGS. 5A to 5C show examples of dark images acquired in states where vibrations having different frequencies act.
Figure 5B:
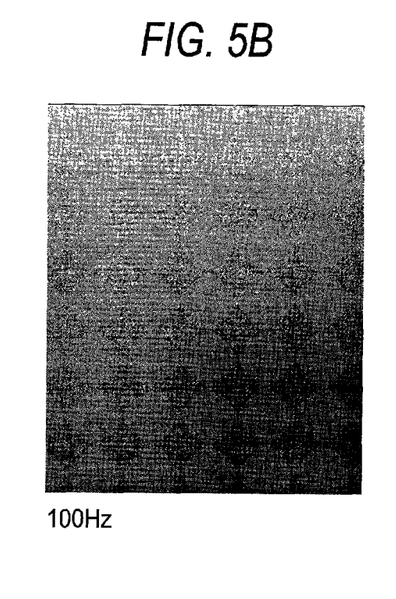
Figure 5C:
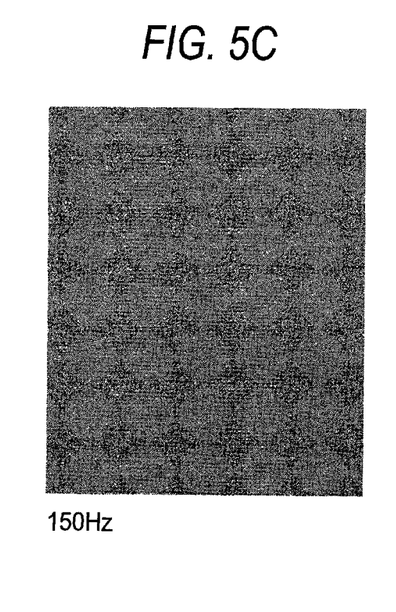

FIG. 5 shows one example of a dark image acquired when vibrations having different frequencies act.

Since reading-out the electrical charge from each pixel 20 by the signal processing circuit 23 is performed for single row (pixel group connected to a common scan line 22a), the vibration acts thereon. Therefore, as shown in FIG. 5, stripe-like image spots having a repetition period in a column direction are produced in the dark image. The stripe-like image spots tend to become stronger as amplitude of the vibration becomes larger. Since the period of the stripe-like image spots tends to be reduced as the frequency of the vibration becomes higher, the image spots contained in the stripe-like image spots may gradually become not recognizable as image spots.

The determination of the control circuit 27 as to whether the vibration is within the allowable range may be performed, for example, using a predetermined threshold value for the amplitude (absolute value) of the vibration. Specifically, the control circuit 27 may be configured to determine that the vibration is out of the allowable range when the amplitude of the vibration detected by the sensor 43 exceeds the threshold value and to determine that the vibration is within the allowable range when the amplitude of the detected vibration is equal to or less than the threshold value.

The determination of the control circuit 27 as to whether the vibration is within the allowable range may be performed using, for example, a predetermined threshold value for the frequency of the vibration. Specifically, the control circuit 27 may be configured to determine that the vibration is out of the allowable range when the frequency of the vibration detected by the sensor 43 is less than the threshold value and to determine that the vibration is within the allowable range when the frequency of the detected vibration is equal to or more than the threshold value.

With the above determination method, the dark image data including the image spots acquired in the state where an excessive vibration acts on the X-ray image detection apparatus 1 may be prevented from being used as the correction data.

The offset correction data acquired as described above is used for the offset correction of the X-ray image data acquired during the first photographing performed after activation and all photographings performed up to a shutdown of the X-ray image detection apparatus 1, and in the correction unit 42, a suitable offset correction is performed for the acquired X-ray image data.

It is described that the offset correction data is configured by one dark image data, but a plurality of dark image data acquired under the action of the vibration within the allowable range may be used to obtain an average of the plurality of dark image data in the correction data generating unit 40 to be used as the offset correction data.

It is described that the updating of the storage unit 41 by the correction data generating unit 40 is prohibited after acquiring the dark image data by the signal processing circuit 23 when the vibration is out of the allowable range, but the generation of the dark image data by the signal processing circuit 23 may be prohibited, and the electrical charge of each pixel 20 may be read-out and then discarded.

In order to prevent the vibration from being acted on the X-ray image detection apparatus 1 due to the movement of the X-ray image detection apparatus 1 when the offset correction data has been acquired, it is preferable to provide a notifying unit which notifies that the offset correction data is being acquired in the X-ray image detection apparatus 1. For example, the notifying unit may use an LED, and may be configured to turn ON the LED while acquiring the offset correction data.

Figure 6:
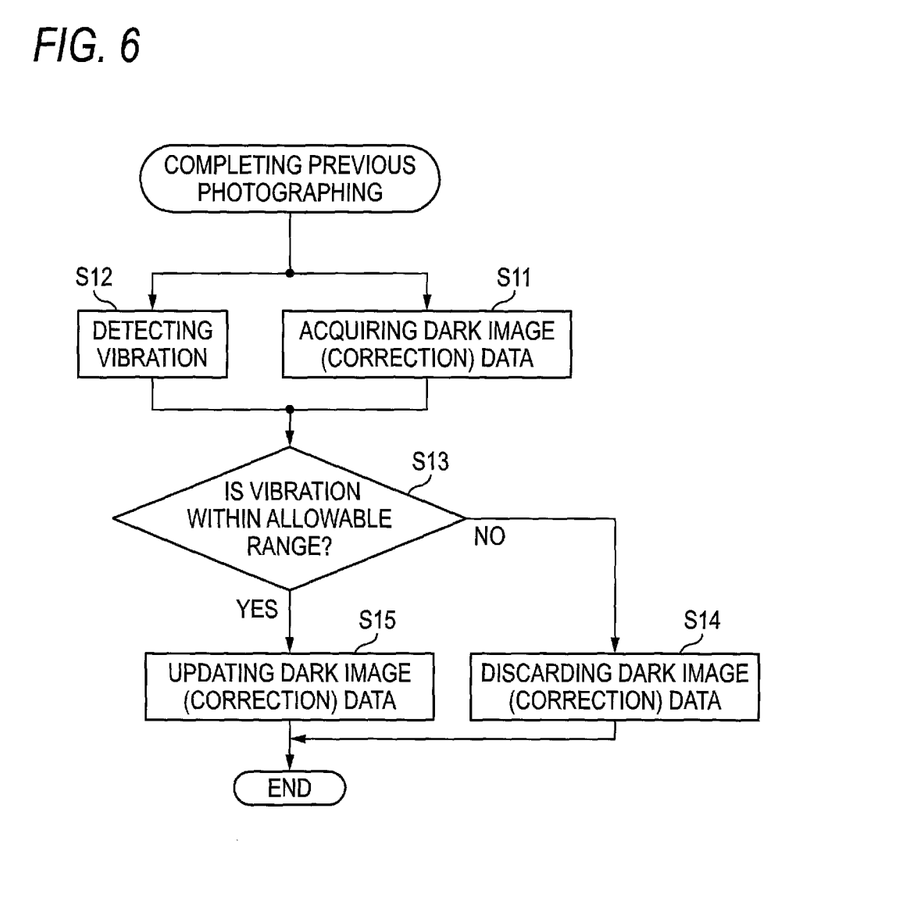
FIG. 6 is a flowchart illustrating another example of a process for acquiring a correction data in the radiological image detection apparatus of FIG. 1.

FIG. 6 shows one example of a flow for acquiring offset correction data.

FIG. 6 shows a flow for acquiring the correction data for offset correction between photographing times.

After completing the previous photographing, the electrical charge is read-out by the signal processing circuit 23 from each pixel 20 of the image receiving unit 21 to generate dark image data in a state where the image receiving unit 21 is not exposed to the X-ray, and the correction data generating unit 40 of the correction circuit 24 acquires the dark image data from the signal processing circuit 23 (step S11).

When the dark image data is acquired, the vibration acting on the X-ray image detection apparatus 1 is also detected by the sensor 43 (step S12).

The control circuit 27 acquires vibration information detected by the sensor 43 and determines whether the vibration is within the allowable range (step S13). The determination, as described above, may be performed using the predetermined threshold value for the amplitude (absolute value) of the vibration or the frequency of the vibration.

If it is determined that the vibration is out of the allowable range, the control circuit 27 prohibits an updating of the storage unit 41 by the correction data generating unit 40. The correction data generating unit 40 discards the dark image data which the correction data generating unit 40 stores (step S14).

If it is determined that the vibration is within the allowable range, the control circuit 27 permits an updating of the storage unit 41 by the correction data generating unit 40. The correction data generating unit 40 updates the storage unit 41 by the dark image data in which the correction data generating unit 40 stores (step S15).

According to those described above, the acquisition of the offset correction data between photographing times is completed. The offset correction data acquired as described above is used for the offset correction of the X-ray image data acquired in the previous photographing, for example, and the suitable offset correction is performed for the X-ray image data by the correction unit 42.

If it is determined that the vibration is out of the allowable range, the acquisition of the dark image data may be attempted several times between before performing of next photographing and after discarding the dark image data.

Here, for example, in performing a continuous photographing while changing photographing portions of the same subject, when the vibration is not converged within the allowable range within the photographing interval, the updating of the storage unit 41 is not performed between photographing times. In this case, the offset correction is performed for the X-ray image data acquired in the previous photographing using the previous offset correction data stored in the storage unit 41. Since the previous offset correction data stored in the storage unit 41 is not affected or is slightly affected by the vibration, the suitable offset correction may be performed for the X-ray image data.

The determination as to whether updating of the correction data is permitted and the determination as to whether the photographing is permitted are independently performed. Therefore, if the updating of the correction data is determined to be permitted, new correction data is used, and if not, previous correction data stored in the storage unit is used, making it possible to expediently take action for updating of the correction data. Therefore, the photographing may be efficiently progressed in the continuous photographing.

Even when the offset correction data is acquired between the photographing times, an average of the plurality of dark image data acquired under action of the vibration within the allowable range is obtained and the average may be used as the correction data. When the action of the vibration is out of the allowable range, it may also be configured that the updating of the storage unit 41 by the correction data generating unit 40 is prohibited to disable the generation of the dark image data by the signal processing circuit 23, read-out and then discard the electrical charge of each pixel 20.

As described above, though the example of detecting the vibration as the disturbance and determining as to whether the updating of the offset correction data based on the detection result is permitted has been described, it may also be configurable that the load may be detected as the disturbance to determine as to whether the updating of the offset correction data based on the detection result is permitted.

Figure 7:
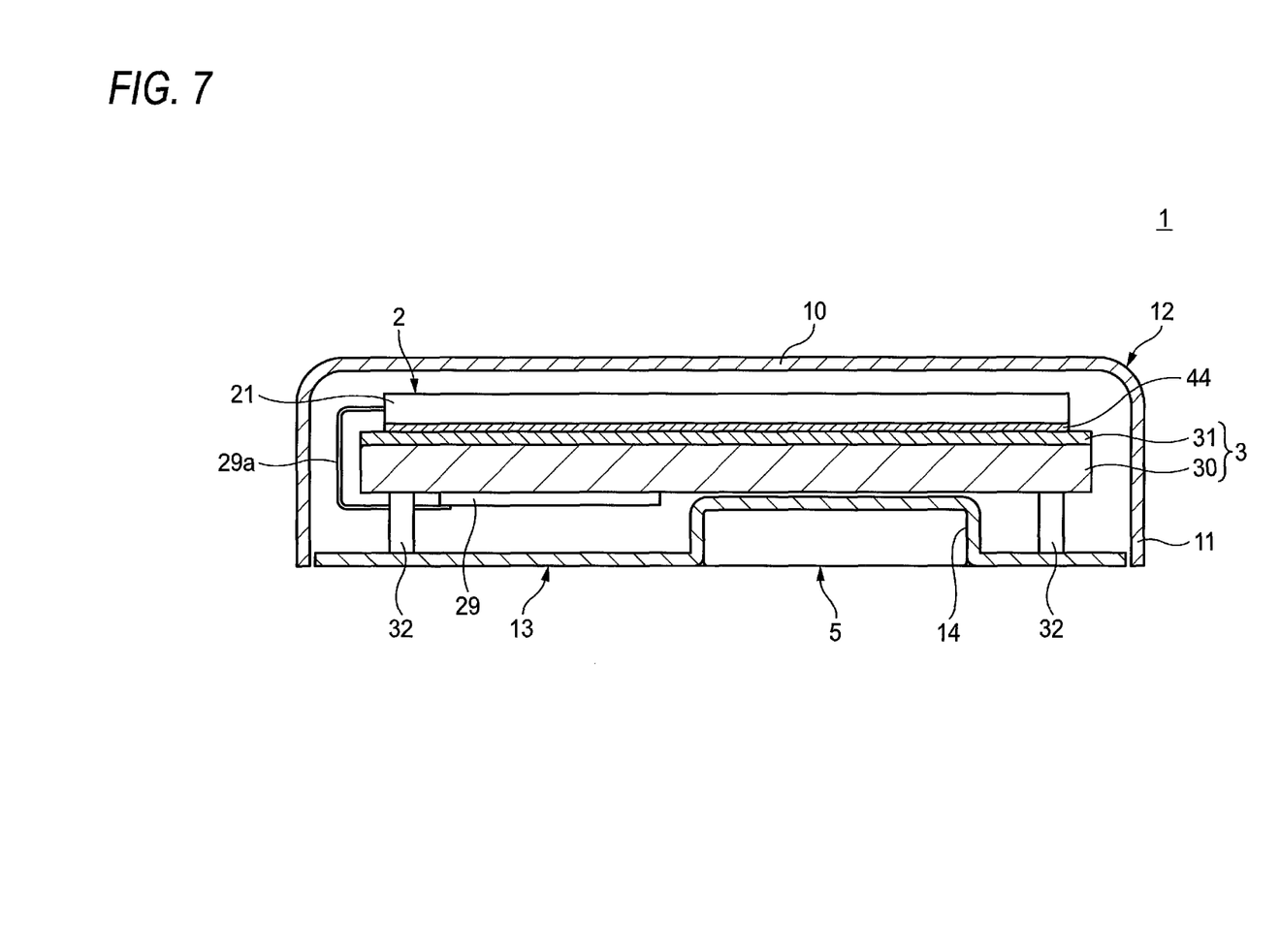
FIG. 7 is a cross sectional view of a modification example of the radiological image detection apparatus of FIG. 1.

FIG. 7 shows a cross section of a configuration of a modification example of the X-ray image detection apparatus 1.

The X-ray image detection apparatus 1 as shown in FIG. 7 is provided with a sensor 44 detecting distributed load that acts on the image receiving unit 21 of the FPD 2. A gap is typically produced between the top plate part 10 of the case 4 and the image receiving unit 21, but there is a case in which the subject (for example, patient) is loaded on the top plate part 10 and as a result, the top plate part 10 is bent to contact the top plate part 10 and the image receiving unit 21 with each other, so that the load of the subject is applied on the image receiving unit 21.

The sensor 44 is provided to be sandwiched between the image receiving unit 21 and the base 3. A sheet type sensor in which a plurality of pressure-sensitive elements are distributably arranged may be used as the sensor 44, and as the pressure-sensitive element, for example, a distortion gauge resistive type, a semiconductor piezoresistive type or a capacitance type may be used.

Figure 8:
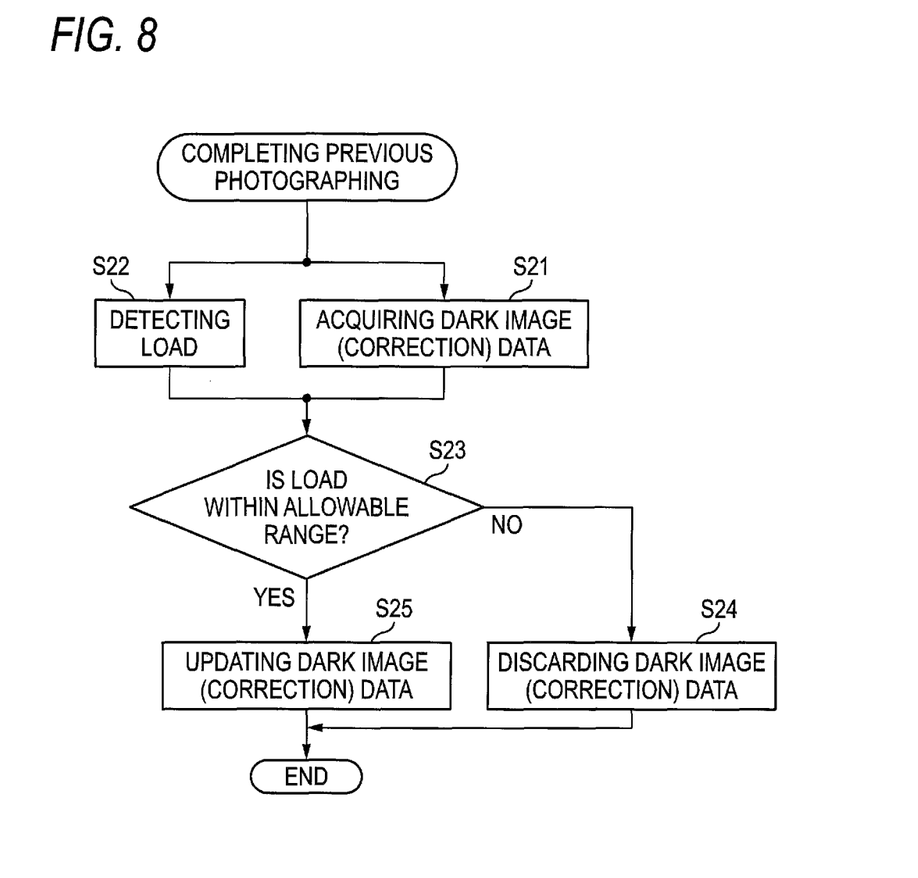
FIG. 8 is a flowchart illustrating one example of a process for acquiring the correction data in the radiological image detection apparatus of FIG. 7.

FIG. 8 shows one example of a flow for acquiring offset correction data.

FIG. 8 shows a flow for acquiring correction data for offset correction between photographing times.

After completing the previous photographing, the electrical charge is read-out by the signal processing circuit 23 from each pixel 20 of the image receiving unit 21 to generate dark image data in a state where the image receiving unit 21 is not exposed to the X-ray, and the correction data generating unit 40 of the correction circuit 24 acquires the dark image data from the signal processing circuit 23 (step S21).

When the dark image data is acquired, the distributed load acting on the image receiving unit 21 of the FPD 2 is also detected by the sensor 44 (step S22).

The control circuit 27 acquires load information detected by the sensor 44 and determines whether or not the load is within the allowable range (step S23).

If it is determined that the load is out of the allowable range, then the control circuit 27 prohibits an updating of the storage unit 41 by the correction data generating unit 40. The correction data generating unit 40 discards the dark image data which the correction data generating unit 40 stores (step S24).

If it is determined that the load is within the allowable range, the control circuit 27 permits an updating of the storage unit 41 by the correction data generating unit 40. The correction data generating unit 40 updates the storage unit 41 by the dark image data which the correction data generating unit 40 stores (step S25).

According to those described above, the acquisition of the correction data for offset correction is completed between photographing times.

Hereinafter, a method of determining the load in the control circuit 27 will be described.

Figure 9:
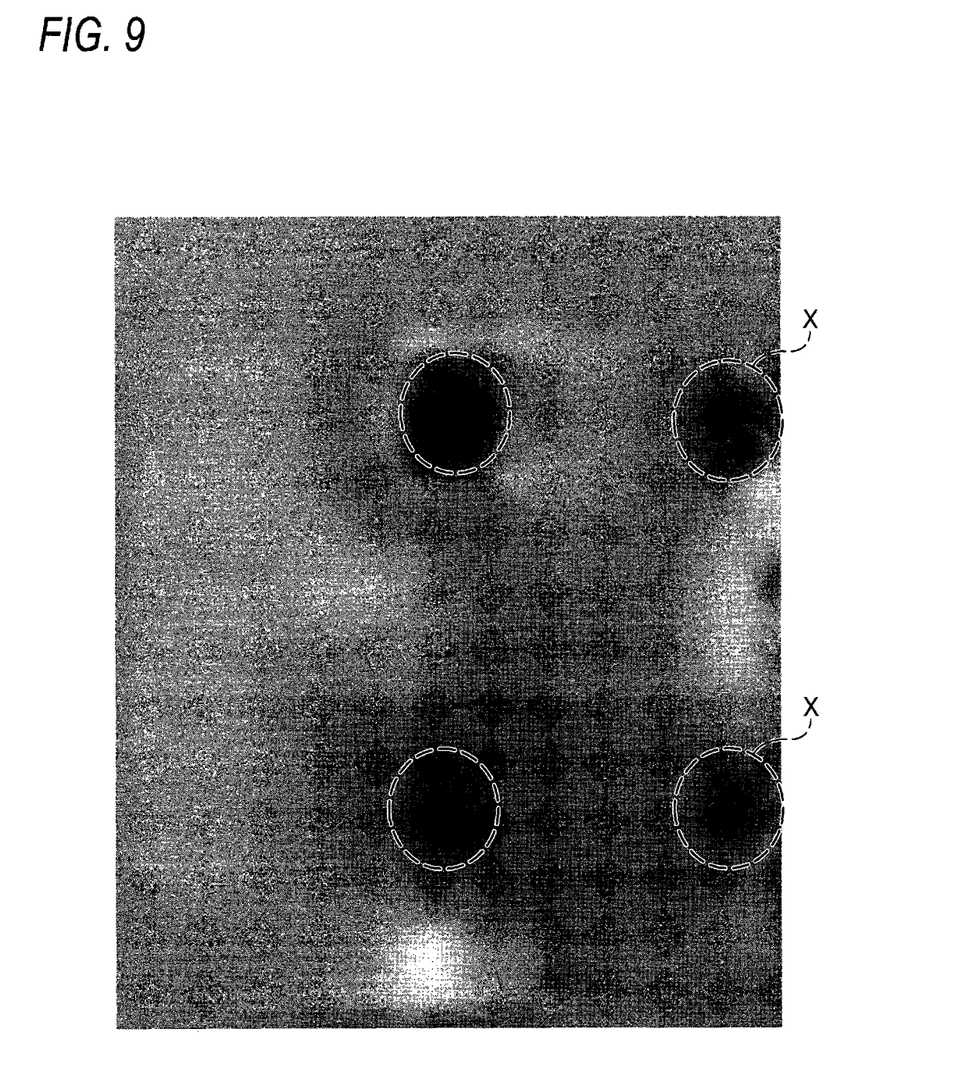
FIG. 9 is a view showing one example of a dark image acquired in a state where a load acts.

FIG. 9 shows one example of a dark image acquired in the state where the load acts on the image receiving unit 21.

If the load acts on the image receiving unit 21, the capacitance of the capacitor of each pixel 20 is changed, and also the dark current characteristics of each pixel 20 are changed. Particularly, in the dark image acquired in the state where the load locally acts on the receiving unit 21, the image spot is produced between a region (the region surrounding by a broken line circle) on which the load acts and a region on which the load does not act as shown in FIG. 9.

The determination of the control circuit 27 as to whether the load is within the allowable range may be performed in accordance with an existence or non-existence of the detection of the load using the sensor 44 which is calibrated (zero-point corrected), for example. In other words, the control circuit 27 may be configured to determine that the load is out of the allowable range when the load is detected by the sensor 44, and to determine that the load is within the allowable range when the load is not detected.

The determination of the control circuit 27 as to whether the load is within the allowable range may be performed using a predetermined threshold value for a spatial frequency of the distributed load, for example. Specifically, the control circuit 27 may determine that the load is out of the allowable range when a component which exceeds the threshold value is included in the spatial frequency of the distributed load detected by the sensor 44, and determine that the load is within the allowable range when a component which exceeds the threshold value is not included in the spatial frequency of the detected distributed load.

With the above determination method, the dark image data including the image spot acquired in the state where the load is locally acting on the image receiving unit 21 may be prevented from being used as the correction data.

The offset correction data acquired as described above is used for the offset correction of the X-ray image data acquired in the previous photographing, for example, and the suitable offset correction is performed for the X-ray image data by the correction unit 42.

If it is determined that the load is out of the allowable range, it may be allowable to attempt the acquisition of the dark image data several times between after discarding of the dark image and before performing of the next photographing.

Here, for example, in performing a continuous photographing while changing photographing portions of the same subject, when the load is not converged within the allowable range within the photographing interval, the updating of the storage unit 41 is not performed between photographing times. In this case, the offset correction is performed for the X-ray image data acquired in the previous photographing using the previous offset correction data stored in the storage unit 41. Since the previous offset correction data stored in the storage unit 41 is not affected or is slightly affected by the load, the suitable offset correction may be performed for the X-ray image data.

The determination as to whether updating of the correction data is permitted and the determination as to whether photographing is permitted are independently performed. Therefore, if the updating of the correction data is determined to be permitted, new correction data is used, and if not, previous correction data stored in the storage unit is used, making it possible to expediently take action for updating of the correction data. Therefore, the photographing may be efficiently progressed in the continuous photographing.

Even when the offset correction data is acquired between photographing times, an average of the plurality of dark image data acquired under action of the load within the allowable range is obtained and the average may be used as the correction data. When the action of the load is out of the allowable range, it may also be configurable that the updating of the storage unit 41 by the correction data generating unit 40 is prohibited to disable the generation of the dark image data by the signal processing circuit 23, read-out and then discard the electrical charge of each pixel 20.

The sensor 43 (see FIG. 3) which detects the vibration acting on the X-ray image detection apparatus 1 is provided to determine whether or not both the load and the vibration are within the allowable range by the control circuit 27. Then, it may be configurable that the offset correction data is acquired only when both the load and the vibration are within the allowable range.

In above description, the process of acquiring the offset correction data for offset correction has been described by way of an example of the correction process, but the process may be applied to the afterimage correction or the image defect correction which generates the correction data using the dark image.

The afterimage correction will be described first. The afterimage is produced as a portion of the electrical charge accumulated in the pixel 20 of the image receiving unit 21 of the FPD 2 in the previous photographing remains in each pixel 20, and the electrical charge remaining in each pixel 20 is read-out together with the electrical charge accumulated in each pixel 20 in the next photographing. The image (afterimage) generated based on the remaining electrical charge appears on the dark image or the X-ray image acquired after the previous photographing.

Since the afterimage decays spontaneously with a time elapse, the afterimage correction is performed by applying a suitable weight value to the dark image data in consideration of time decay of the afterimage and subtracting the weighted dark image data from the X-ray image data acquired in the next photographing.

In this way, the dark image data is also used as the correction data even in the afterimage correction, and the process of acquiring the correction data as shown in FIGS. 6 and 8 may be applied to the afterimage correction. Therefore, it is possible to perform the suitable afterimage correction for the X-ray image data.

Since data obtained by applying the weight value to the dark image data in consideration of the time decay of the afterimage is used as the correction data in the afterimage correction, the image spot of the dark image is not necessarily observed in the X-ray image data. For example, in a case that the elapse time from the previous photographing is relatively long, just the afterimage correction data acquired under action of the vibration or the load which is out of the allowable range may also be used for the afterimage correction.

For both of the offset correction data and the afterimage correction data as described above, it may also be configurable that selection is made for either the case of determining as to whether the updating of the correction data is permitted based on the vibration or the load, or the case of determining as to whether the updating of the correction data is permitted based on the vibration or the load only for the offset correction data and as to whether updating of the correction data is permitted irrespective of the vibration or the load for the afterimage correction data.

Next, the pixel defect correction will be described. A defective pixel is produced for example, by deterioration with elapses of time, an electrostatic breakdown and the like in the image receiving unit 21 of the FPD 2. The pixel defect correction is performed by interpolating a pixel value corresponding to the defective pixel by a pixel value corresponding to a normal pixel therearound, in the X-ray image data acquired by the photographing, using a defect map (correction data) indicative of a location of the defective pixel.

The level of the electrical charge read-out from the defective pixel sets the threshold values of the upper and the lower limits for the pixel value making up the dark image data according to whether the level becomes larger or smaller as compared with other normal pixels, and a pixel out of the range of the threshold values is detected. Therefore, the defective pixel may be detected in the image receiving unit 21 and the defect map is generated by detecting the defective pixel.

Figure 10:
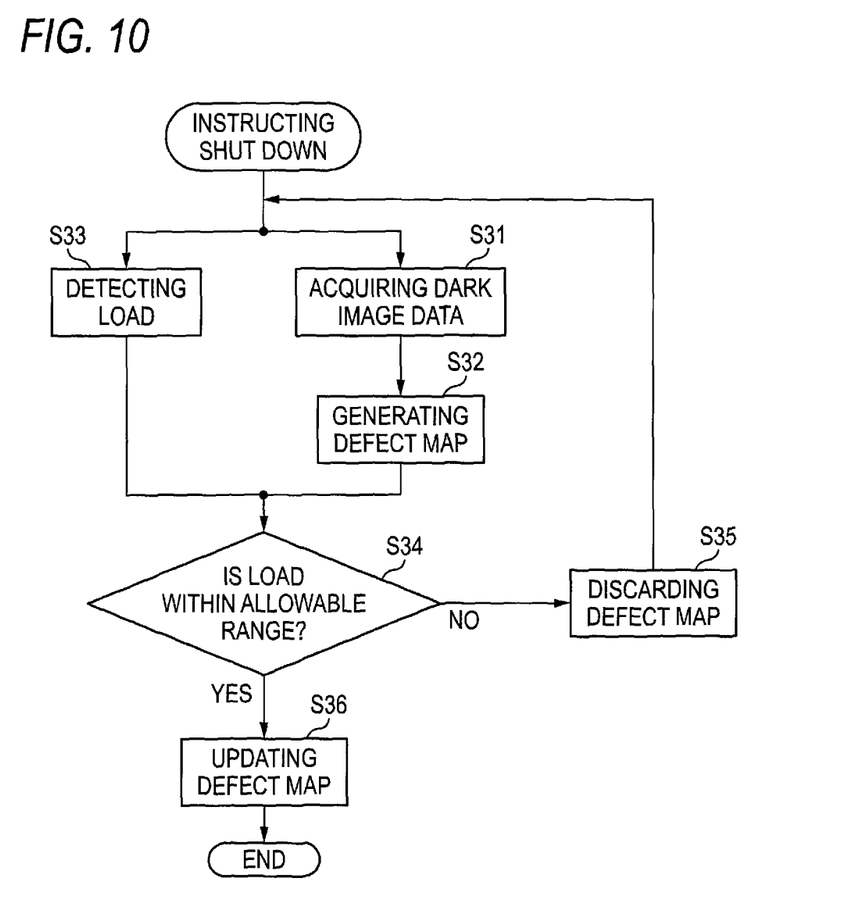
FIG. 10 is a flowchart illustrating another example of a process for acquiring the correction data in the radiological image detection apparatus of FIG. 1.

FIG. 10 shows one example of a flow for acquiring the defect map.

An example shown in FIG. 10 shows a flow for acquiring the defect map in the process when shunting down the X-ray image detection apparatus 1.

When shunting down the X-ray image detection apparatus 1, the electrical charge is read-out by the signal processing circuit 23 from each pixel 20 of the image receiving unit 21 to generate dark image data in a state where the image receiving unit 21 is not exposed to the X-ray, and the correction data generating unit 40 of the correction circuit 24 acquires the dark image data from the signal processing circuit 23 (step S31), and generates a defect map based on the acquired dark image data (step S32).

When the dark image data is acquired, the vibration acting on the X-ray image detection apparatus 1 is also detected by the sensor 43 (step S33).

The control circuit 27 acquires vibration information detected by sensor 43 and determines whether or not the vibration is within the allowable range (step S34). The determination method as described above may be performed using the predetermined threshold value for the amplitude (absolute value) of the vibration or the frequency of the vibration.

If it is determined that the vibration is out of the allowable range, the control circuit 27 prohibits an updating of the storage unit 41 by the correction data generating unit 40. The correction data generating unit 40 discards the defect map which the correction data generating unit 40 stores (step S35).

If it is determined that the vibration is within the allowable range, then the control circuit 27 permits an updating of the storage unit 41 by the correction data generating unit 40. The correction data generating unit 40 updates the storage unit 41 with the defect map which the correction data generating unit 40 stores (step S36).

The example of determining as to whether the updating of the defect map is permitted has been described based on the vibration. However, it may also be configurable that the determination as to whether the updating of the defect map is permitted based on the load, or both the vibration and the load may be performed.

Even when the defect map is acquired, an average of the plurality of dark image data acquired under the action of the vibration or the load within the allowable range is obtained and the defect map may be generated based on the average. It may also be configurable that the updating of the storage unit 41 by the correction data generating unit 40 under the action of the vibration or the load which is out of the allowable range is prohibited to disable the generation of the dark image data by the signal processing circuit 23, and read-out and then discard the electrical charge of each pixel 20.

The general X-ray is utilized as the radiation in the above-describe exemplary embodiment, but the present invention is not limited to the X-ray, and the radiation such as α-ray and γ-ray, in addition to the X-ray, may be utilized.

As described above, the present specification discloses the radiological image detection apparatus of (1) to (13) as described below.

(1) A radiological image detection apparatus including:

an imaging unit that includes a plurality of pixels arranged in a two-dimensional array which detect a radiation and convert the radiation to an electrical signal, and acquires radiological image data based on the electrical signal output from each pixel;

a storage unit that stores correction data for correcting the radiological image data acquired by the imaging unit while the imaging unit is exposed to the radiation;

a correction data generating unit that generates new correction data based on dark image data acquired by the imaging unit while the imaging unit is not exposed to the radiation and updates the correction data stored in the storage unit by the new correction data;

a correction unit that performs a correction process for the radiological image data using the correction data stored in the storage unit;

a disturbance detection unit that detects a disturbance acting when the imaging unit acquires the dark image data; and a determination unit that determines whether the updating of the correction data stored in the storage unit by the correction data generating unit is permitted, or whether the acquisition of the dark image data by the imaging unit is permitted, based on the detection result of the disturbance detection unit.

(2) The radiological image detection apparatus of (1), wherein the disturbance detection unit has a sensor for detecting the disturbance.

(3) The radiological image detection apparatus of (1) or (2) further including:

a notifying unit that notifies that the imaging unit is acquiring the dark image data, when the imaging unit acquires the dark image data.

(4) The radiological image detection apparatus of any one of (1) to (3), wherein the imaging unit acquires the dark image data in at least any one of a time when activating the radiological image detection apparatus, a time when stopping the radiological image detection apparatus, a time when waiting, and between photographing times.

(5) The radiological image detection apparatus of any one of (1) to (4), wherein the disturbance detection unit detects a vibration, if an absolute value of an amplitude of the vibration detected by the disturbance detection unit is equal to or less than a predetermined threshold value, the determination unit determines that the updating of the storage unit or the generation of the correction data is permitted, and if the absolute value is greater than the predetermined threshold value, the determination unit determines that the updating of the storage unit or the generation of the correction data is not permitted.

(6) The radiological image detection apparatus of any one of (1) to (4), wherein the disturbance detection unit detects a vibration, if a frequency of the vibration detected by the disturbance detection unit is equal to or more than a predetermined frequency, the determination unit determines that the updating of the storage unit or the generation of the correction data is permitted, and if the frequency is less than the predetermined frequency, the determination unit determines that the updating of the storage unit or the generation of the correction data t is not permitted.

(7) The radiological image detection apparatus of (1) to (4), wherein the disturbance detection unit is configured to detect load onto the imaging unit, if the load is not detected by the disturbance detection unit, the determination unit determines that the updating of the storage unit or the generation of the correction data is permitted, and if the load is detected by the disturbance detection unit, the determination unit determines that the updating of the storage unit or the generation of the correction data is not permitted.

(8) The radiological image detection apparatus of any one of (1) to (4), wherein the disturbance detection unit is configured to detect load onto the imaging unit, if a component equal to or more than a predetermined frequency is not included in a spatial frequency of a load distribution detected by the detection unit, the determination unit determines that the updating of the storage unit or the generation of the correction data is permitted, and if a component equal to or more than the predetermined frequency is included in the spatial frequency, the determination unit determines that the updating of the storage unit or the generation of the correction data is not permitted.

(9) The radiological image detection apparatus of any one of (1) to (8), wherein the correction process by the correction unit is an offset correction.

(10) The radiological image detection apparatus of any one of (1) to (8), wherein the correction process by the correction unit is an afterimage correction.

(11) The radiological image detection apparatus of any one of (1) to (8), wherein the correction process by the correction unit is a pixel defect correction.

(12) A portable radiological image detection apparatus of any one of (1) to (11).

(13) The radiological image detection apparatus of (1), wherein the correction unit performs the correction process for the radiological image data using an average data of the correction data stored in the storage unit.

What is claimed is:

1. A radiological image detection apparatus comprising:
   an imaging unit that includes a plurality of pixels arranged in a two-dimensional array which detect a radiation and convert the radiation to an electrical signal, and acquires radiological image data based on the electrical signal output from each pixel;
   a storage unit that stores correction data for correcting the radiological image data acquired by the imaging unit while the imaging unit is exposed to the radiation;
   a correction data generating unit that generates new correction data based on dark image data acquired by the imaging unit while the imaging unit is not exposed to the radiation and updates the correction data stored in the storage unit by the new correction data;
   a correction unit that performs a correction process for the radiological image data using the correction data stored in the storage unit;
   a disturbance detection unit that detects a disturbance acting when the imaging unit acquires the dark image data; and
   a determination unit that, in response to the detection result being within an allowable range, determines the updating of the correction data stored in the storage unit by the correction data generating unit and the acquisition of the dark image data by the imaging unit are permitted, and in response to the detection result being without the allowable range, determines the updating of the correction data stored in the storage unit by the correction data generating unit and the acquisition of the dark image data by the imaging unit are prohibited, based on the detection result of the disturbance detection unit,
   wherein, in response to the determination indicating that the updating of the correction data stored in the storage unit by the correction data generating unit and the acquisition of the dark image data by the imaging unit are prohibited, the correction unit performs the correction process using previous correction data stored in the storage unit, and
   wherein the disturbance detection unit is configured to detect load onto the imaging unit.

2. The radiological image detection apparatus according to claim 1, wherein the disturbance detection unit has a sensor for detecting the disturbance.

3. The radiological image detection apparatus according to claim 1, further comprising:
   a notifying unit that notifies that the imaging unit is acquiring the dark image data, when the imaging unit acquires the dark image data.

4. The radiological image detection apparatus according to claim 1, wherein the imaging unit acquires the dark image data in at least any one of a time when activating the radiological image detection apparatus, a time when stopping the radiological image detection apparatus, a time when waiting, and between photographing times.

5. The radiological image detection apparatus according to claim 1, wherein the disturbance detection unit detects a vibration,
   if an absolute value of an amplitude of the vibration detected by the disturbance detection unit is equal to or less than a predetermined threshold value, the determination unit determines that the updating of the storage unit or the generation of the correction data is permitted, and
   if the absolute value is greater than the predetermined threshold value, the determination unit determines that the updating of the storage unit or the generation of the correction data is not permitted.

6. The radiological image detection apparatus according to claim 1, wherein the disturbance detection unit detects a vibration,
   if a frequency of the vibration detected by the disturbance detection unit is equal to or more than a predetermined frequency, the determination unit determines that the updating of the storage unit or the generation of the correction data is permitted, and
   if the frequency is less than the predetermined frequency, the determination unit determines that the updating of the storage unit or the generation of the correction data is not permitted.

7. The radiological image detection apparatus according to claim 1,
wherein if the load is not detected by the disturbance detection unit, the determination unit determines that the updating of the storage unit or the generation of the correction data is permitted, and
wherein if the load is detected by the disturbance detection unit, the determination unit determines that the updating of the storage unit or the generation of the correction data is not permitted.

8. The radiological image detection apparatus according to claim 1,
wherein if a component equal to or more than a predetermined frequency is not included in a spatial frequency of a load distribution detected by the detection unit, the determination unit determines that the updating of the storage unit or the generation of the correction data is permitted, and
wherein if a component equal to or more than the predetermined frequency is included in the spatial frequency, the determination unit determines that the updating of the storage unit or the generation of the correction data is not permitted.

9. The radiological image detection apparatus according to claim 1, wherein the correction process by the correction unit is an offset correction.

10. The radiological image detection apparatus according to claim 1, wherein the correction process by the correction unit is an afterimage correction.

11. The radiological image detection apparatus according to claim 1, wherein the correction process by the correction unit is a pixel defect correction.

12. The radiological image detection apparatus according to claim 1, wherein the correction unit performs the correction process for the radiological image data using an average data of the correction data stored in the storage unit.

13. A portable radiological image detection apparatus comprising:
an imaging unit that includes a plurality of pixels arranged in a two-dimensional array which detect a radiation and convert the radiation to an electrical signal, and acquires radiological image data based on the electrical signal output from each pixel;
a storage unit that stores correction data for correcting the radiological image data acquired by the imaging unit while the imaging unit is exposed to the radiation;
a correction data generating unit that generates new correction data based on dark image data acquired by the imaging unit while the imaging unit is not exposed to the radiation and updates the correction data stored in the storage unit by the new correction data;
a correction unit that performs a correction process for the radiological image data using the correction data stored in the storage unit;
a disturbance detection unit that detects a disturbance acting when the imaging unit acquires the dark image data; and
a determination unit that, in response to the detection result being within an allowable range, determines the updating of the correction data stored in the storage unit by the correction data generating unit and the acquisition of the dark image data by the imaging unit are permitted, and in response to the detection result being without the allowable range, determines the updating of the correction data stored in the storage unit by the correction data generating unit and the acquisition of the dark image data by the imaging unit are not permitted, based on the detection result of the disturbance detection unit;
wherein, in response to the determination indicating that the updating of the correction data stored in the storage unit by the correction data generating unit and the acquisition of the dark image data by the imaging unit are not permitted, the correction unit performs the correction process using previous correction data stored in the storage unit, and
wherein the disturbance detection unit is configured to detect load onto the imaging unit.

* * * * *